O. L. McKINLEY.
HARROW.
APPLICATION FILED SEPT. 17, 1913.
1,109,442.
Patented Sept. 1, 1914.
2 SHEETS—SHEET 1.
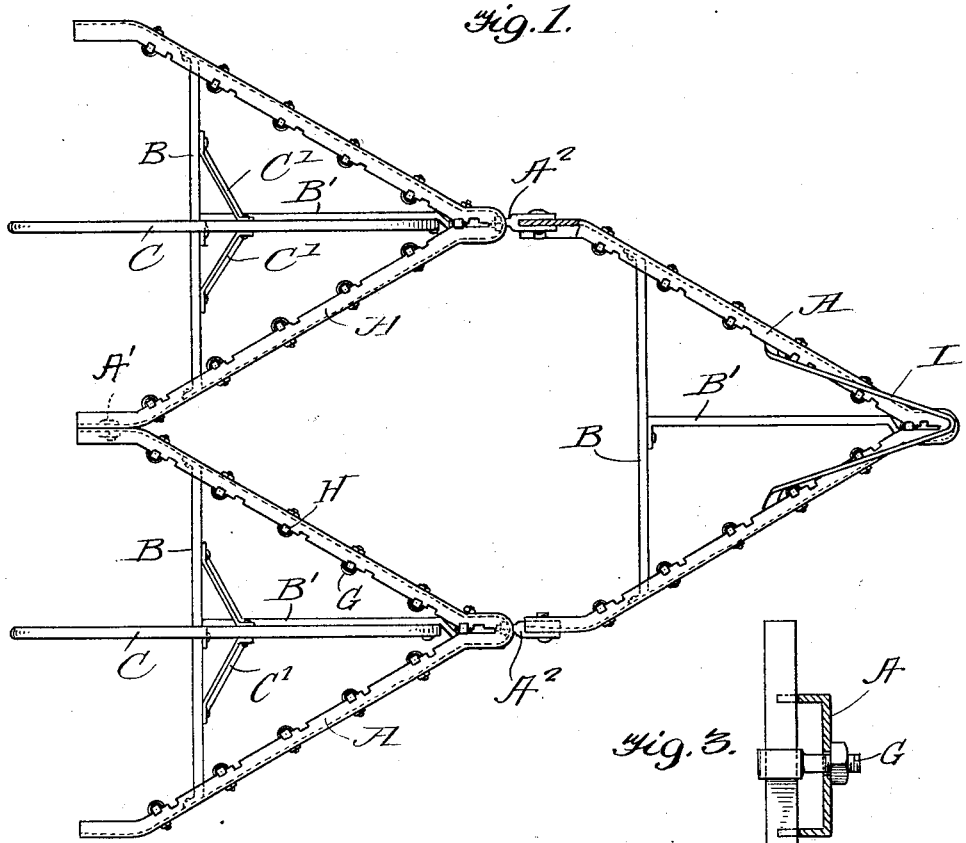
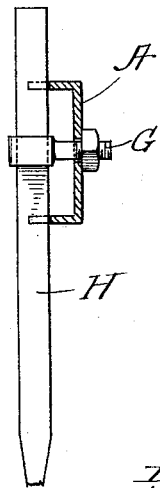
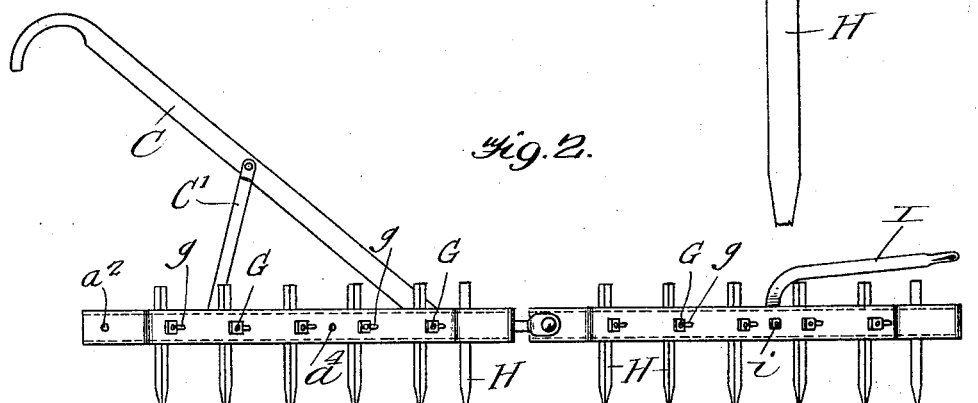
WITNESSES
INVENTOR
OSCAR LEE McKINLEY,
BY
ATTORNEYS

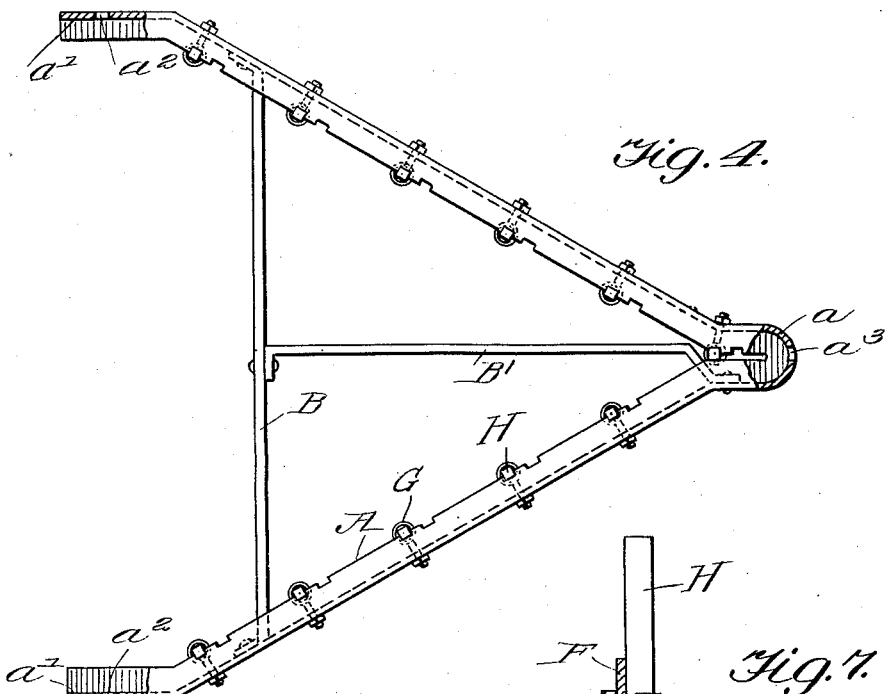
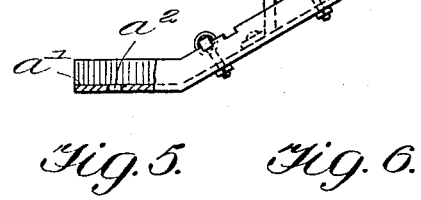
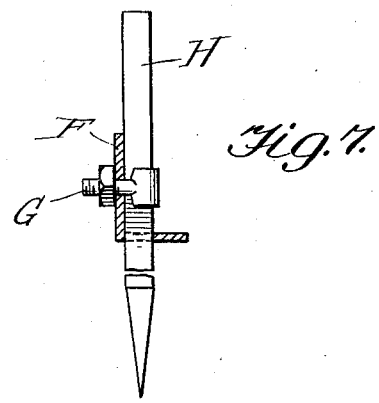
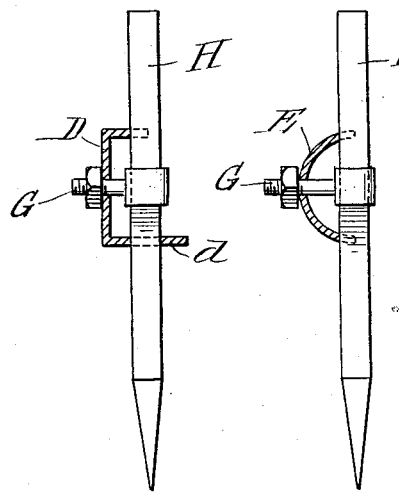
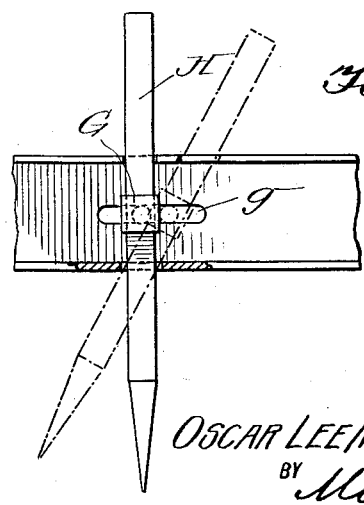

UNITED STATES PATENT OFFICE.

OSCAR LEE McKINLEY, OF DEMOPOLIS, ALABAMA.

HARROW.

1,109,442.  Specification of Letters Patent.  Patented Sept. 1, 1914.

Application filed September 17, 1913. Serial No. 790,195.

*To all whom it may concern:*

Be it known that I, OSCAR LEE MCKINLEY, a citizen of the United States, and a resident of Demopolis, in the county of Marengo and State of Alabama, have invented an Improvement in Harrows, of which the following is a specification.

My present invention relates to harrows and more particularly to sectional harrows, my object being to provide a sectional harrow in which each section is so constructed that a plurality thereof may be selectively assembled without regard to rights or lefts, or fronts or rears.

A further object of my invention is to provide a harrow section so formed as to permit of the arrangement of the harrow teeth in a triangle of which the head tooth will be directly in line with the center of the draft.

These and the other objects of my invention will be clearly apparent from the following description in which reference is submitted to the accompanying drawings, forming part of the specification and in which, Figure 1 is a plan view illustrating the arrangement of three sections. Fig. 2 is a side elevation thereof. Fig. 3 is a transverse vertical section on an enlarged scale, taken through one side bar of one of the sections. Fig. 4 is a plan view of one of the sections, its front and rear portions being broken away. Fig. 5 is a view similar to Fig. 3 illustrating a slightly modified form of the frame bar. Fig. 6 is a similar view illustrating another modified form of frame bar. Fig. 7 is a similar view illustrating still another modified form, and Fig. 8 is an elevation looking at the inner surface of the frame bar seen in Fig. 3.

Referring now to these figures, I have shown in Fig. 1, a harrow made up of three sections, each of which is indicated at A and one of which is shown in detail in Fig. 4. From this latter figure it is to be noted that each of the harrow sections consists of a frame generally V-shaped in form and opening rearwardly, being provided at its apex with an elongated goose neck curve $a$ and having angular extensions $a'$ at its ends arranged parallel with the line of draft. It will also be noted that the frame is constructed of a channel bar, the web of which is upright and the flanges of which are inturned. The web of the bar from which the frame is formed is provided at the extreme forward central portion of the goose neck curve $a$ with an opening $a^3$ and is also provided with openings $a^2$ in the angular elongations $a'$ at the rear end of the frame. In this manner two sections may be coupled in juxtaposed relation by placing their adjacent elongated ends $a'$ against one another and coupling these ends by means of a connecting bolt indicated in dotted lines at A' in Fig. 1. Likewise a third section may be conveniently coupled in front by means of split bolts $A^2$, having their rear ends connected through the forward opening $a^3$ of the rear sections and having their forward bifurcated ends straddling the elongated extensions $a'$ of the front section and secured by fastening members extending through the apertures $a^2$ of said extensions. In this manner it will be seen that a harrow may be formed by a plurality of sections assembled without regard to rights or lefts or fronts or rears as before stated. Each of the sections A has a cross brace B extending transversely thereof adjacent its rear end and a central longitudinal brace B' the rear end of which is connected intermediate the ends of the cross brace. In this manner each of the sections is well adapted to the connection of a handle C and its braces C'. From the structure of the frame thus described it will be readily seen that the particular structure of the bar from which the frame is formed may be varied to a considerable extent. This will be better appreciated from a comparison of the several figures illustrating in detail different forms of bars. Thus in Figs. 1 to 4 inclusive I have illustrated a channel beam, the upper and lower flanges of which are of equal width. In Fig. 5 I have shown the same structure varied slightly in so far as the width of the flanges is concerned, the lower flange $d$ of the beam D in this figure being considerable wider than the upper flange. In Fig. 6 I have shown a half-round bar E and in Fig. 7 is illustrated an angular bar F. In each of these forms the bar is provided with an intermediate longitudinal slot, such as shown at $g$ in Fig. 8 in order to receive a clamping bolt G for clamping each of the harrow teeth H, the bolt being adjustable in slot $g$ in order to hold its respective tooth either in a vertical position as shown in full lines in this figure or in inclined position as indicated in dotted lines.

In the form shown in Figs. 1 to 4 and 8 the inner edges of the channel bar flanges are provided with notches in which the harrow teeth are set in both their vertical and inclined positions, as is also the half-round bar as shown in Fig. 6. The angular bar as shown in Fig. 7 and the form of channel bar as shown in Fig. 5 are provided with openings in their lower flanges through which the harrow teeth extend, the last mentioned form having notches in its upper flanges.

As will be seen by referring to Figs. 1, 2 and 4 the harrow teeth H are distributed at equidistantly spaced points along the inner surfaces of the frame sides, one tooth being located within the goose neck curve $a$, by virtue of which it is disposed centrally of the line of draft and forms a true triangle with the several other teeth in order to eliminate all side draft.

Referring now to Figs. 1 and 2 it will also be seen that each of the sections is provided with an opening $a^4$ intermediate each side thereof so that each section is adapted to receive the rear lower ends of an upwardly and forwardly inclined draft connecting member I, secured thereto by means of bolts $i$.

It will thus be seen that I am enabled to provide a harrow section from which a harrow of suitable proportions may be readily and conveniently formed by assembling a selected number of sections without respect to rights or lefts, fronts or rears, and that I accomplish this important advantage by such means as will enable me to eliminate all side draft and permit of the formation of each section by means of bars of various types. It is to be understood of course, that although I have described the flanges of the frame bars as extending inwardly in each instance, they may be turned outwardly with equal facility and secure equal effectiveness in use.

I claim:—

1. A harrow consisting of a plurality of rearwardly opening V-shaped sections, each of which sections is provided at its apex with an elongated goose neck curve and with angular extensions at its rear ends projecting parallel with the line of draft, and each section being provided with an aperture centrally of its goose neck curve and apertures in its said extensions, a bolt connecting the adjacent side extensions of each pair of rear sections and passing through the openings of said extensions, and a bolt secured through the opening of the goose neck curve of each rear section and connected at its forward end to one of the rear extensions of one of the said sections, substantially shown and described.

2. A harrow section consisting of a substantially V-shaped frame having a forwardly elongated goose neck curve substantially in the center of the line of draft and having angular rearward extensions at its rear ends arranged parallel with the line of draft, the frame being also provided with apertures in the central forward portion of its goose neck curve and through its rear extensions, and a plurality of teeth adjustably connected along the frame sides, substantially as described.

3. A harrow section consisting of a substantially V-shaped frame having transverse and longitudinal brace members and having a forwardly elongated goose neck curve at its apex, and a plurality of harrow teeth adjustably mounted along the inner surface of the frame, the forward tooth of which is disposed within the goose neck curve and in line with the teeth along that of the frame sides whereby to eliminate all side draft.

OSCAR LEE McKINLEY.

Witnesses:
E. L. BUSH,
J. B. MALLET.

Copies of this patent may be obtained for five cents each, by addressing the "Commissioner of Patents, Washington, D. C."